United States Patent
Ilarregui et al.

(10) Patent No.: US 9,432,108 B2
(45) Date of Patent: *Aug. 30, 2016

(54) AUGMENTED AIRCRAFT COMMUNICATION SYSTEM

(71) Applicant: ADS-B Technologies, LLC, Anchorage, AK (US)

(72) Inventors: Carlos Maria Ilarregui, Aventura, FL (US); Michael Steven Melum, Anchorage, AK (US); Robert C. Nelson, Anchorage, AK (US)

(73) Assignee: ADS-B Technologies, LLC, Anchorage, AK (US)

( * ) Notice: Subject to any disclaimer, the term of this patent is extended or adjusted under 35 U.S.C. 154(b) by 494 days.

This patent is subject to a terminal disclaimer.

(21) Appl. No.: 13/725,310

(22) Filed: Dec. 21, 2012

(65) Prior Publication Data

US 2014/0078954 A1   Mar. 20, 2014

Related U.S. Application Data

(63) Continuation of application No. 12/698,135, filed on Feb. 1, 2010, now Pat. No. 8,442,518.

(51) Int. Cl.
    *H04W 4/00*    (2009.01)
    *H04B 7/185*   (2006.01)
    *H04B 7/155*   (2006.01)

(52) U.S. Cl.
    CPC ...... *H04B 7/18508* (2013.01); *H04B 7/15592* (2013.01); *H04B 7/18506* (2013.01); *H04B 7/18582* (2013.01)

(58) Field of Classification Search
    CPC .................................................. H04B 7/18506
    USPC .............................. 455/7, 12.1, 431; 370/316
    See application file for complete search history.

(56) References Cited

U.S. PATENT DOCUMENTS

| | | |
|---|---|---|
| 6,151,308 A | 11/2000 | Ibanez-Meier |
| 7,639,844 B2 | 12/2009 | Haddad |
| 8,442,518 B2 | 5/2013 | Ilarregui |
| 8,634,827 B2 | 1/2014 | Melum |
| 2003/0008611 A1 | 1/2003 | Forman et al. |
| 2004/0032367 A1 | 2/2004 | Smith et al. |
| 2008/0106457 A1 | 5/2008 | Bartolini et al. |
| 2009/0310530 A1 | 12/2009 | Cerra et al. |
| 2010/0085236 A1 | 4/2010 | Franceschini et al. |

(Continued)

FOREIGN PATENT DOCUMENTS

| | | |
|---|---|---|
| EP | 1826913 | 8/2007 |
| WO | WO2007/059560 | 5/2007 |

(Continued)

OTHER PUBLICATIONS

EP11737412: Rule 161 and 162 claim amendments, mailed Jan. 16, 2013, 9 pages.

(Continued)

*Primary Examiner* — Hsin-Chun Liao
(74) *Attorney, Agent, or Firm* — Berkeley Law & Technology Group, LLP

(57) ABSTRACT

Subject matter disclosed herein relates to aircraft communication, and more particularly to a non line-of-sight communication path to augment a line-of-sight communication path.

27 Claims, 6 Drawing Sheets

(56) References Cited

U.S. PATENT DOCUMENTS

2011/0163908 A1 7/2011 Andersson et al.
2012/0214420 A1 8/2012 O'Connor et al.

FOREIGN PATENT DOCUMENTS

WO    WO2007/064252    6/2007
WO    WO/2011/094021   8/2011

OTHER PUBLICATIONS

EP11737412: Supplemental Search report, mailed Feb. 13, 2014, 7 pages.
US Department of Transportation Federal Aviation Administration, "Draft Advisory Circular, Vehicle ADS-B Squitter Equipment," Jun. 11, 2010, pp. 1-10.
US Department of Transportation Federal Aviation Administration, "Vehicle Automatic Dependent Surveillance-Broadcast (ADS-B) Specification," Jan. 31, 2011, pp. 1-34.
U.S. Appl. No. 12/698,135, filed Feb. 1, 2010, 44 Pages.
U.S. Appl. No. 12/698,135: Notice to File Missing Parts, Filed on Mar. 5, 2010, 5 Pages.
U.S. Appl. No. 12/698,135: Applicant Response to Pre-Exam, Mailed May 5, 2010, 17 Pages.
U.S. Appl. No. 12/698,135: Filing Receipt, Filed May 14, 2010, 3 Pages.
U.S. Appl. No. 12/698,135: Any Document Coming from L and R, Mailed May 21, 2010, 4 Pages.
U.S. Appl. No. 12/698,135: Any Request Going to L and R, Mailed Jul. 1, 2010, 6 Pages.
U.S. Appl. No. 12/698,135: Preliminary Amendment, Mailed Jul. 19, 2010, 4 Pages.
U.S. Appl. No. 12/698,135: Any Document Coming from L and R, Mailed Aug. 14, 2010, 3 Pages.
U.S. Appl. No. 12/698,135: Notice of New or Revised Publication Date, Mailed Aug. 19, 2010, 1 Page.
U.S. Appl. No. 12/698,135: Notice of Publication, Mailed Aug. 4, 2011, 1 Page.
U.S. Appl. No. 12/698,135: Non-Final Rejection, Mailed Jun. 20, 2012, 14 Pages.
U.S. Appl. No. 12/698,135: Reconsideration After Non-Final Reject, Mailed Sep. 12, 2012, 14 Pages.
U.S. Appl. No. 12/698,135: Notice of Allowance, Mailed Sep. 27, 2012, 11 Pages.
U.S. Appl. No. 12/698,135: Filing Receipt, Mailed Nov. 6, 2012, 3 Pages.
U.S. Appl. No. 12/698,135: And Document Coming from L and R, Mailed Nov. 8, 2012, 1 Page.
U.S. Appl. No. 12/698,135: Issue Fee Payment, Mailed Dec. 19, 2012, 1 page.
U.S. Appl. No. 12/698,135: Issue Notification, Mailed Apr. 24, 2013, 1 Page.
U.S. Appl. No. 13/104,906, filed May 10, 2011, 34 Pages.
U.S. Appl. No. 13/104,906: Notice to File Missing Parts, Filed May 31, 2011, 2 Pages.
U.S. Appl. No. 13/104,906: Applicant Response to Pre-Exam Formalities, Mailed Jul. 22, 2011, 6 Pages.
U.S. Appl. No. 13/104,906: Filing Receipt, Mailed Jul. 29, 2011, 3 Pages.
U.S. Appl. No. 13/104,906: Notice of Publication, Mailed Nov. 10, 2011, 1 Page.
U.S. Appl. No. 13/104,906: Non-Final rejection, Mailed Apr. 23, 2013, 14 Pages.
U.S. Appl. No. 13/104,906: Reconsideration-After Non-Final Reject, Mailed Aug. 22, 2013, 11 Pages.
U.S. Appl. No. 13/104,906: Notice of Allowance and Fees Due, Mailed Sep. 16, 2013, 9 Pages.
U.S. Appl. No. 13/104,906: Issue Notification, mailed Dec. 31, 2013, 1 Page.
U.S. Appl. No. 14/132,714: Preliminary Amendment, filed Dec. 18, 2013, 55 Pages.
U.S. Appl. No. 14/132,714: Notice to File Missing Parts, Filing Receipt, Mailed Jan. 8, 2014, 5 Pages.
PCT/US2011/000170: Application as filed on Feb. 1, 2010, 29 pages.
PCT/US2011/000170: International search report, mailed Apr. 1, 2011, 2 pages.
PCT/US2011/000170: Written Opinion of the International Search Authority, mailed Apr. 1, 2011, 5 pages.
PCT/US2011/000170: International preliminary report on patentability, mailed Aug. 7, 2012, 6 pages.
U.S. Appl. No. 14/132,714: Applicant Response to Pre-Exam Formalities Notice, filed Feb. 20, 2014, 2 pages.
U.S. Appl. No. 14/132,714: Filing Receipt, mailed Mar. 6, 2014, 3 pages.
U.S. Appl. No. 14/132,714: Notice of Publication, mailed Jun. 12, 2014, 1 page.
U.S. Appl. No. 14/132,714: Non-Final Rejection, mailed Jun. 16, 2015, 17 pages.

AUGMENTED AIRCRAFT COMMUNICATION SYSTEM

BACKGROUND

1. Field

Subject matter disclosed herein relates to aircraft communication, and more particularly, to a non line-of-sight communication path to augment a line-of-sight communication path.

2. Information

Flying aircraft may communicate to other aircraft or ground stations to convey a variety of information, such as the aircraft's position or velocity, mechanical state of the aircraft, and so on. Such information may be used for air traffic control or to relay weather or other flying conditions from aircraft to aircraft, for example. Methods of communicating information may involve wirelessly transmitting or receiving radio frequency (RF) signals among aircraft or ground-based stations.

Some methods of communication may be limited to situations where an RF receiver has a line of sight to an RF transmitter. One example is an automatic dependent surveillance-broadcast (ADS-B) system. For example, RF signals broadcast from an aircraft may be received by a radio receiver that is within a line-of-sight range of the broadcasting aircraft. A radio receiver may be located on another aircraft or at a ground-based station.

However, some situations may occur that limit or prevent line-of-sight communication. For example, aircraft operating in polar regions or other remote regions may be out of range (e.g., beyond line-of-sight range) of ground stations. For another example, aircraft may operate in areas that lack ground-based communication stations or other infrastructure. Building or providing ground stations in some of these areas may be expensive or even cost prohibitive. For yet another example, a mountain range may be located between a low-flying aircraft and a ground station. Techniques or approaches to address situations that limit or prevent line-of-sight communication may be desirable

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
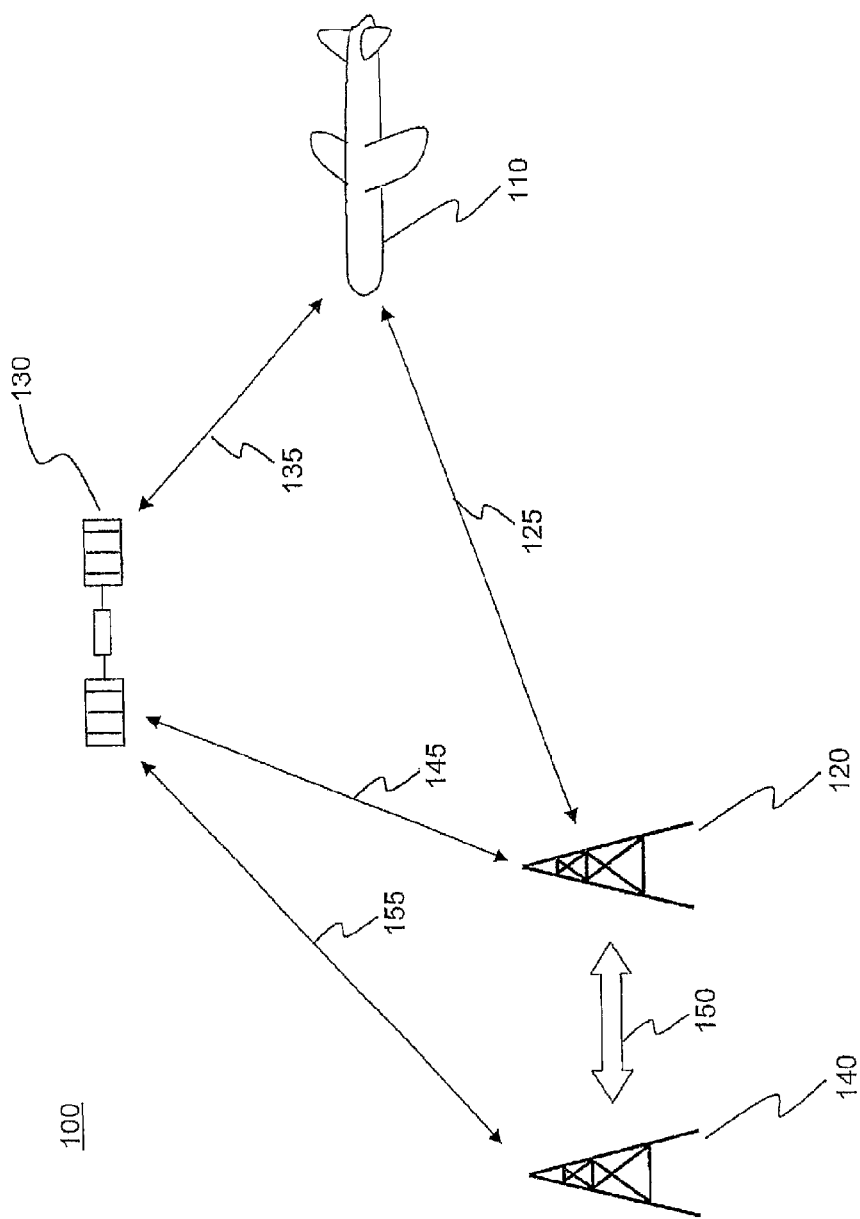
FIG. 1 is a schematic diagram of communication paths between an aircraft and ground stations, according to an embodiment.

Reference throughout this specification to "one embodiment" or "an embodiment" means that a particular feature, structure, or characteristic described in connection with an embodiment is included in at least one embodiment of claimed subject matter. Thus, appearances of the phrase "in one embodiment" or "an embodiment" in various places throughout this specification are not necessarily all referring to the same embodiment. Furthermore, particular features, structures, or characteristics may be combined in one or more embodiments.

In some cases, it may be desirable to use a technique for communication that need not rely on line-of-sight communication. However, among various techniques for communication, a relatively small number are well-situated as "standard" communication for a majority of commercial aircraft, for example. Aircraft, for example, may be equipped with particular communication equipment that may be relatively expensive to replace or modify. Moreover, successful communication among aircraft or ground stations may rely on aircraft or ground stations using "like" communication equipment. Accordingly, aircraft operators, air traffic control, or other entities involved with airlines or air traffic may resist acceptance of modified communication equipment or alternate techniques for communication among aircraft or ground stations, particularly if it involves changing procedures, processes, protocols or calls for special training.

Accordingly, in an embodiment, a communication technique may involve providing equipment to augment existing equipment in such a way as to not significantly change or modify existing communication infrastructure, as discussed in detail below. Although claimed subject matter is not limited in scope on a particular implementation, one possible approach may involve providing equipment able to passively interact with existing communication equipment. In one possible embodiment, for example, communication transmissions may be sampled from existing communication equipment to acquire a copy or to replicate transmitted communications. In one possible implementation, subsequently, a transmission copy or replica may be reformatted, if desired, so that it may be transmitted over a medium different than that used by existing communication equipment. A reformatted transmission may then be received at a desired destination, for example, and reformatted again, but in this case, to be made compatible or compliant with existing communication equipment or infrastructure. Therefore, communication information may be transmitted or received over an alternative medium in a manner so that existing communication equipment remains useable, as now explained in detail.

In an embodiment, an already-present aircraft communication system utilizing line-of-sight communication may be augmented by placement or installation of a secondary aircraft communication system. Hereinafter, an already-present aircraft communication system may be referred to as a primary system and a secondary aircraft communication system may be referred to as a secondary system. For example, an aircraft may use a primary system to communicate with another aircraft or a ground station, which may comprise an airport control tower, an air traffic control center, or other ground-based communication facility. Communication may involve a line of sight between an aircraft and another aircraft or between an aircraft and a ground station. However, if a line of sight were to be interrupted by a mountain range or the curvature of the earth, a primary system communication may fail to meet expected standards of communication reliability, for example. However, in one possible implementation, for example, a secondary system may be used to augment a primary system. Furthermore, a secondary system, if RF based, for example, may be employed that need not rely on a line of sight to provide reliable communications between an aircraft and another aircraft or between an aircraft and a ground station. In a particular implementation, a secondary system may involve a communication relay, such as, in one example, without limitation, a satellite to convey communication signals from an aircraft to a desired communication destination, for example. Accordingly, a secondary system may be utilized in situations in which communication via a primary line-of-sight system may not be sufficiently reliable.

In a particular embodiment, installation or presence of a secondary system need not disrupt a configuration or operation of a primary system, although claimed subject matter is not necessarily limited in this respect. Interruption, interference, or modification of a primary system may introduce a number of complications if a primary system, for example, comprises a standardized communication system with respect to an extensive airline industry or infrastructure. Complications may include, as examples, difficult-to-acquire approvals or certifications of modified standardized communication system, expense related to modifying or replacing a standardized communication system or infrastructure that relies upon consistent use of similar communications equipment across most, if not all, users. Employing a secondary system that passively interacts with a primary system may therefore, provide a number of benefits. It may, for example, permit augmenting a primary system with a secondary system without substantially modifying or interfering with the primary system. Of course, above is merely a short list of possible benefits, and claimed subject matter is not so limited. For example, another complication may include an infrastructure in which separate aircraft are provided separate communications channel. This may limit the number of available channels beyond which too many communication transmissions may collide. Employing a secondary system provides a benefit or not using additional channels of a primary system, for example.

In a particular embodiment, a secondary system may (e.g., "behind the scenes") transmit communication signals produced by a primary system without additional user action. Similarly, a primary system may receive communication signals produced by a secondary system without additional user action. Thus, a user of a primary system need not be aware that a secondary system may be performing transmitting or receiving of communication signals. To carry out a process, for example, in one possible implementation, an induced signal representation, obtained via inductive coupling of communication signals produced by a primary system, may be provided to a secondary system. A technique for performing inductive coupling may involve a directional coupler, for example. Of course, other techniques are possible, and claimed subject matter is not so limited.

In one embodiment, a primary system may comprise an automatic dependent surveillance-broadcast (ADS-B) system, which may involve a cooperative surveillance technique for air traffic control or related applications. An ADS-B-equipped aircraft may determine its own position using a global navigation satellite system and may periodically, or otherwise, broadcast position or other information to potential ground stations or other aircraft having ADS-B equipment. An ADS-B system may provide relatively accurate information regarding a state of an aircraft to airspace users or controllers, thus potentially providing improved use of airspace, reduced ceiling/visibility restrictions, improved surface surveillance, and so on. In one implementation, an ADS-B system may comprise three components: a transmitting subsystem to acquire and transmit signal information at a source such as an aircraft; a transport protocol, such as VHF, 1090ES, or 978 MHz (UAT); and a receiving subsystem, including signal information reception or report assembly operations at a receiving destination, such as another aircraft or ground system, for example. Of course, a primary system need not comprise an ADS-B system, and claimed subject matter is not so limited. An ADS-B system is merely provided as one example system.

FIG. 1 is a schematic diagram of possible communication paths between an aircraft 110 and a ground station 120, according to an embodiment. As discussed above, a primary system may rely on a line of sight from source to receiver, e.g., from aircraft to ground station. Communication path 125 may comprise a line of sight between aircraft 110 and ground station 120. An alternate communication path between aircraft 110 and ground station 120 may comprise communication path 135 between aircraft 110 and communication relay 130 or communication path 145 between communication relay 130 and ground station 120. Another alternate communication path between aircraft 110 and ground station 120 may comprise communication path 155 between communication relay 130 and relay ground station 140 or communication path 150 between relay ground station 140 and ground station 120. While communication paths 125, 135, 145, and 155 may comprise wireless electromagnetic wave transmission through space, for example, communication path 150 may comprise a communication infrastructure utilized by the Internet, an intranet, a wide area network (WAN), a local area network (LAN), a plain old telephone service (POTS), or other communication link, though claimed subject matter is not so limited. Other types of communication infrastructure are possible and are intended to be included within the scope of claimed subject matter. Although one communication relay 130 is shown in FIG. 1, more than one relay may be included in a communication link between aircraft 110 and ground station 120, for example. In this context, the term communication relay is intended to refer to a device able to acquire and further transmit communications.

As described above, while communication path 125 comprises a line-of-sight communication link between aircraft 110 and ground station 120, a secondary system may comprise an alternate communication link that includes communication relay 130. For example, an alternate communication link may comprise telephone, microwave, UHF, VHF, satellite, or other media capable of providing a communication path. A secondary system may be used for communication between aircraft 110 and ground station 120 in the absence of availability of line-of-sight communication path 125. For example, aircraft 110 and ground station 120 may be separated by a mountain range or a relatively large distance so that reception or transmission signal strength, for example, is below acceptable levels for effective or reliable signal communications, such as between aircraft 110 and ground station 120. Of course, claimed subject matter is not limited to utilizing a secondary system in place of a primary, line-of-sight system for any particular reason or desire.

In an embodiment, communication relay 130 may comprise a communication satellite, a cellular communication system, or communication equipment on another aircraft (other than aircraft 110), just to name a few examples. Relay ground station 140 may comprise a transceiver to communicate with communication relay 130 or a network communication link, such as communication path 150, as mentioned above. In another implementation, and as explained above, a desired destination for communication from aircraft 110 need not comprise a ground station. For example, a primary or secondary communication may occur between an aircraft and one or more other aircraft. Accordingly, claimed subject matter is not limited to any particular communication source or destination. Furthermore, a communication destination may not necessarily constitute a final communication destination. This may depend, for example, on the particular context, situation, or system.

Figure 2:
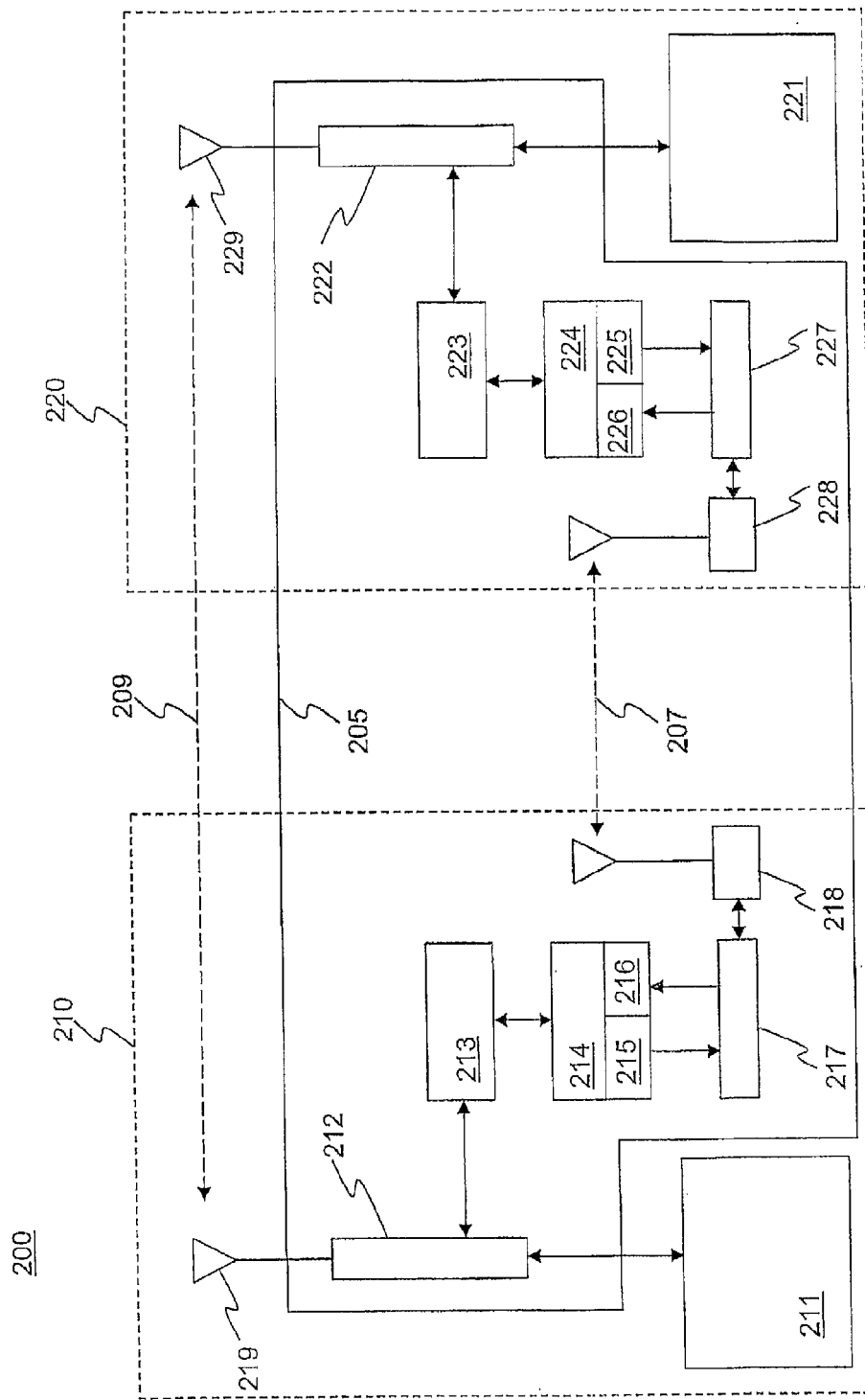
FIG. 2 is a block diagram of an augmented aircraft communication system, according to an embodiment.

FIG. 2 is a block diagram of an augmented aircraft communication system 200, according to an embodiment. Herein, the term "system" may include at least a portion of a communication device or system comprising one or more components, such as a subsystem, as an example, of a device or system. Therefore, for example, a communication system may comprise a receiver portion or subsystem, a transmitter portion or subsystem, or both. In a particular implementation, as shown in FIG. 2, communication system 200 may comprise an aircraft communication system 210 and a ground station communication system 220. As mentioned above, a ground station communication system 220 may comprise a communication system aboard another aircraft, and the term "ground station" is merely used herein to distinguish between one system that may be aboard an aircraft and another system that may be located elsewhere at a reasonably stationary remote site, such as at a ground station. Also, the terms aircraft communication system and ACC system may be used interchangeably throughout this document and the terms ground station communication system and GSC system may also be used interchangeably throughout this document.

ACC system 210 may comprise a primary system 211 aboard an aircraft and GSC system 220 may comprise primary system 221 located elsewhere, such as at a ground station. A secondary system 205 may be present aboard aircraft or elsewhere to augment communication capability of primary system 211 or primary system 221. In particular, a portion of secondary system 205 aboard an aircraft may comprise a digital synthesizer 213, a digital signal processor 214, a signal modulator 215, a signal demodulator 216, a processor 217, or a transceiver 218. Components of secondary system 205 may be collocated with primary system 211 on an aircraft, for example, though claimed subject matter is not so limited. Signal flow between primary system 211 and secondary system 205 may be bi-directional so that receive or transmit operations may be performed. In a similar fashion, a portion of secondary system 205 aboard another aircraft or ground station may comprise a digital synthesizer 223, a digital signal processor 224, a signal modulator 225, a signal demodulator 226, a processor 227, or a transceiver 228. Components of secondary system 205 may be collocated with primary system 221 on another aircraft or ground station, for example, though claimed subject matter is not so limited. Again, in one embodiment, for example, signal flow between primary system 221 and secondary system 205 may be bi-directional so that receive or transmit operations may be performed. A portion of secondary system 205 aboard an aircraft may communicate with a portion of secondary system 205 aboard another aircraft or ground station via communication link 207. A communication link may comprise an alternate communication path to augment line-of-sight communication link 209 used by primary system 211 and primary system 221.

In a particular implementation, digital synthesizers 213 or 223 may comprise, for example, commercially available hardware to translate signal frequencies up or down from a frequency of a particular signal to a frequency that is more easily demodulated or modulated by a primary or secondary system, for example. Digital signal processors 214 or 224 may, for example, comprise commercially available hardware that is programmable with executable code to demodulate or modulate an RF carrier signal in accordance with a number of various communication protocols, standards, or techniques. Digital signal processors 214 or 224 may amplitude modulate, phase modulate, frequency modulate, or perform various combinations of modulation modes. For example, modes may comprise digital phase shift keying (PSK), continuous phase frequency shift keying (CPFSK), or quadrature phase shift keying (QPSK), just to name a few examples.

In a particular implementation, digital signal processor 214 may comprise signal modulator 215 to modulate a transmission signal provided by digital synthesizer 213 during a transmission operation. Digital signal processor 214 may also comprise signal demodulator 216 to demodulate a received signal during a receiving operation, for example. Similarly, digital signal processor 224 may comprise signal modulator 225 to modulate a transmission signal during a transmission operation. Digital signal processor 224 may also comprise signal demodulator 226 to demodulate a received signal, during a receiving operation, for example. In an embodiment, primary system 211 or primary system 221 may communicate at a faster or slower rate than secondary system 205. For example, primary system 211 or primary system 221 may transmit or receive signals at one megabit per second, whereas secondary system 205 may transmit or receive data at 9600 bits per second. Accordingly, digital signal processors 214 or 224 may increase or decrease a rate at which communication signals may be processed, transmitted, or received to provide compatibility among primary systems 211 and 221 and secondary system 205. Of course, details of primary and secondary systems are merely examples, and claimed subject matter is not so limited.

Processors 217 or 227 may comprise commercially available hardware that may be programmed with executable code using any one of a number of techniques. For example, an interchangeable subscriber identity module (SIM) card may provide stored information that includes desired frequency or modulation/demodulation configuration parameters. Stored information may comprise executable code, parameters to be used by executable code maintained in processors 217 or 227, or both. For example, without limitation, software or firmware updates may be downloaded in this matter. Likewise, multiple configurations may be programmed to be available for various applications. For example, a particular SIM card may configure a secondary system 205 to operate using 978 MHz universal access transceiver (UAT) transport protocol, as it currently exists or may later exist if modified. Yet another particular SIM card may configure a secondary system 205 to operate using 1090ES transport protocol, for example, as it currently exists or may later exist if modified. Accordingly, use of a SIM card or other such memory module may allow a particular secondary system 205 to be compliant, or to be compatible with, a variety of aircraft, airspaces, or aviation infrastructure and communication protocols. In one embodiment, processors 217 or 227 may be programmed to conditionally activate or deactivate secondary system 205 based, at least in part, on location, altitude, time, date, system performance, or other aircraft parameters, though claimed subject matter is not limited in this respect.

In one embodiment, an interface between primary system 211 and secondary system 205 may comprise an antenna to receive at least a portion of signals transmitted by primary system 211 and to provide a sampling of signals to secondary system 205. In another embodiment, a signal interface between primary system 211 and secondary system 205 may comprise a directional coupler 212 to allow communication signals (e.g., electronic or radio frequency) to pass in one direction from primary system 211 to antenna 219 for transmission of signals from ACC system 210 to GSC system 220, for example. While signals pass through directional coupler 212, however, signals may be sampled or extracted to be provided to secondary system 205, via digital synthesizer 213, for example. Directional coupler 212 may operate using inductive coupling, wherein primary system signals passing in a first conductor may electro-magnetically induce a secondary signal in a second conductor that is relatively near the first conductor, although other approaches are also possible. As mentioned, a secondary signal may be provided to secondary system 205. Directional coupler 212 may lead to relatively low signal loss in primary system 211, perhaps less than 0.2 db, for example, although claimed subject matter is not so limited. Accordingly, directional coupler 212 may provide secondary system 205 with a sampling of primary system signals in a passive fashion, wherein primary system 210 need not experience substantial signal loss, operational interruption, or modified configuration (other than, for example, directional coupler 212 in close proximity to at least a portion of an antenna transmission line of primary system 211), for example. Of course, details of a directional coupler are merely examples, and claimed subject matter is not limited in this respect.

In one embodiment, a signal interface between primary system 221 and secondary system 205 may comprise an antenna to receive with greater robustness or reliability at least a portion of signals received by primary system 221 and to provide a sampling to secondary system 205. In another embodiment, a signal interface between primary system 221 and secondary system 205 may comprise a directional coupler 222 to allow communication signals (e.g., electronic or radio frequency) to pass to primary system 221 from antenna 229 for reception of signals to GSC system 220 from ACC system 210, for example. While signals pass through directional coupler 222, however, signals may be sampled or extracted to be provided to secondary system 205, via digital synthesizer 223, for example. Of course, details of a directional coupler are merely examples, and claimed subject matter is not limited in this respect.

Figure 3:
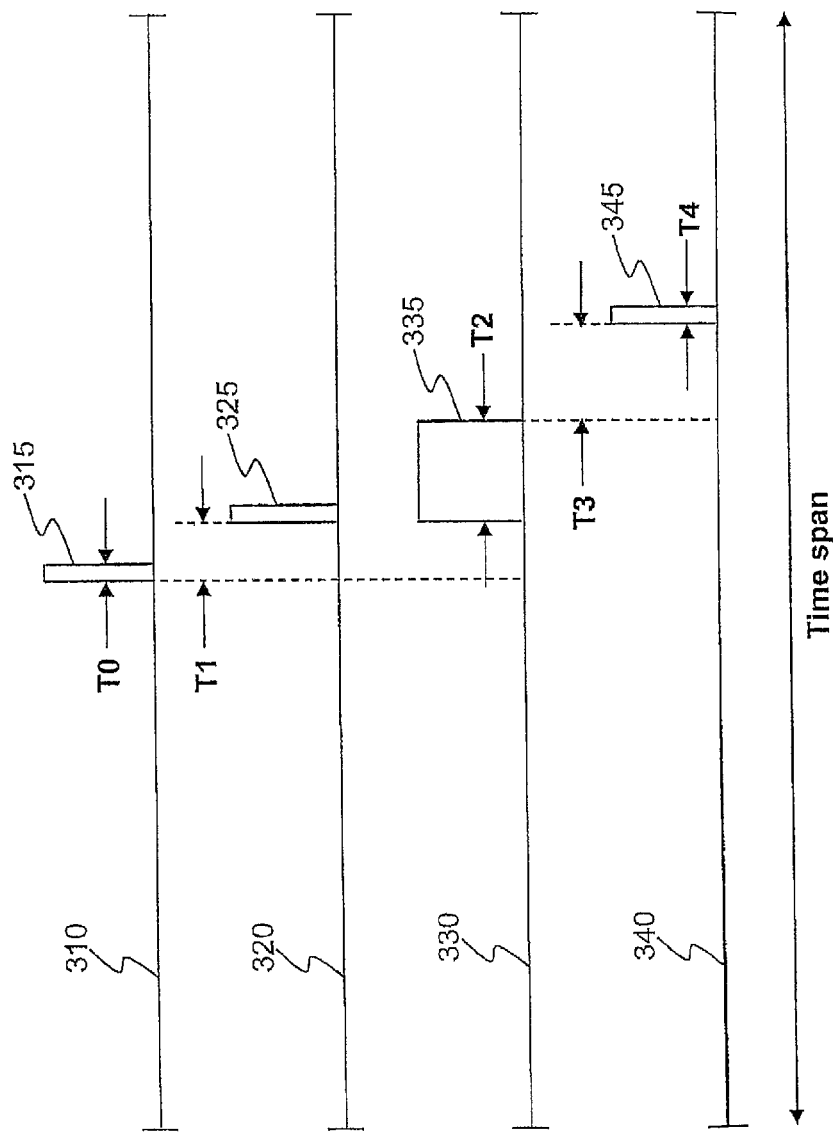
FIG. 3 is a timing diagram of a communication signal in several stages of transmission, according to an embodiment.

FIG. 3 is a timing diagram of a communication signal pulse train in several example stages of transmission in an augmented communication system, according to a particular embodiment. Of course, these are just examples and claimed subject matter is not limited to these illustrative examples. Plots 310, 320, 330, and 340 show relative amplitude of a communication signal pulse train versus time in a one second interval, though such plots are not necessarily to scale. Of course, claimed subject matter is not limited to such details. In plot 310, communication signal pulse train 315 may comprise signal transmission from an aircraft using a primary system. Though pulse train 315 is shown as a single pulse in FIG. 3, pulse train 315 may comprise a series of relatively short pulses. For example, pulse train 315 may comprise one microsecond pulses transmitted at a one megabit per second rate. Thus, pulse train 315 may be several hundred bits long, though claimed subject matter is not so limited. For an illustrative example, T0 may comprise a burst of pulses having a total duration of about 400 microseconds. In one implementation, communication signal pulse train 315 may comprise information related to an aircraft that is transmitting communication signal pulse train 315. For example, information, without limitation, may include an aircraft's location coordinates, altitude, ascent rate, ground speed, airspeed, track angle, heading, call sign, traffic display capability, target heading, target altitude, or other data or tracking information pertinent to the aircraft's status. In another implementation, plot 310 may comprise numerous communication signal pulse trains similar to pulse train 315 representing aircraft information for multiple aircraft, including a relatively large number. In yet another implementation, communication signal pulse train 315 may comprise additional information, such as compressed voice data, telemetry data, text messaging, or text messages, just to name a few examples. In still another implementation, additional information may be uplinked, downlinked, or both. In this particular implementation, uplink refers to information broadcast from a ground station to receiving aircraft, while downlink refers to information transmitted from an aircraft to a ground station or other aircraft. For example, FIS or TIS may comprise uplinked information, while text messaging, voice data, or telemetry may comprise uplinked information, downlinked information, or both.

In plot 320, communication signal pulse train 325 may comprise transmissions of primary system communication signal pulse train 315 communicated to a point at a distance from an aircraft that transmitted communication signal pulse train 315. For example, if a distance is about 200 miles, a transmission delay T1 may be about one millisecond. Of course, in some situations, delay may comprise primarily propagation delay whereas in other situations additional factors may contribute to delay.

In plot 330, communication signal pulse train 335 may comprise transmission from an aircraft using a secondary system. Also described above, a primary system may communicate across a communication channel or link at a rate different than a secondary system. In the example shown in FIG. 3, a primary system may process or transmit communications signals at one megabits per second, resulting in communication signal pulse train 315. In contrast, a secondary system may process or transmit that same communications signals at 9600 bits per second, resulting in communication signal pulse train 335. In other words, communication signal pulse train 335 may comprise a modified or slowed version of communication signal pulse train 315 to accommodate a slower transmission rate of the secondary system. For example, in one implementation, a secondary system may receive and subsequently slow down through signal processing an inductive signal representation of communication signal pulse train 315. Secondary system may transmit communication signal pulse train 335 over a secondary communication link, which may be slower than a primary communication link used by the primary system in some implementations, but not necessarily, of course. For example, duration T2 of communication signal pulse train 335 may be about 47 milliseconds, which is about a factor of 117 wider than pulse train duration T0 of primary system communication signal pulse train 315 in this example.

In plot 340, communication signal pulse train 345 may comprise a received transmission of communication signal pulse train 335 communicated to a receiver about 1600 miles from a transmitting aircraft, for example. In particular, communication signal pulse train 335, subsequent to being received, may be processed to be compliant or compatible and therefore communicated at a higher rate to correspond to a rate that is compatible or compliant with a primary system. Thus, pulse train duration T4 of communication signal pulse train 345 may be substantially the same as pulse train duration T0, for example. A transmission delay T3 comprising latency processing time for converting or reformatting communication signal pulse train 335 in a secondary system to communication signal pulse train 345 in a primary system may be about nine milliseconds in one possible implementation. Adding to latency delays related to converting a data rate used by a primary system to a data rate used by a secondary system, a transmission time of the secondary system may be about 60 milliseconds compared to 1 millisecond for the primary system transmission time in this example. Additional latency may be introduced in a link medium. Reduced overall transmission time may be realized by a number of techniques, such as utilizing a dedicated communications medium to transmit secondary communication signals among land-based receivers or ground stations, for example. Of course, details of communication signal pulse train and associated times are merely examples, and claimed subject matter is not so limited.

Figure 4:
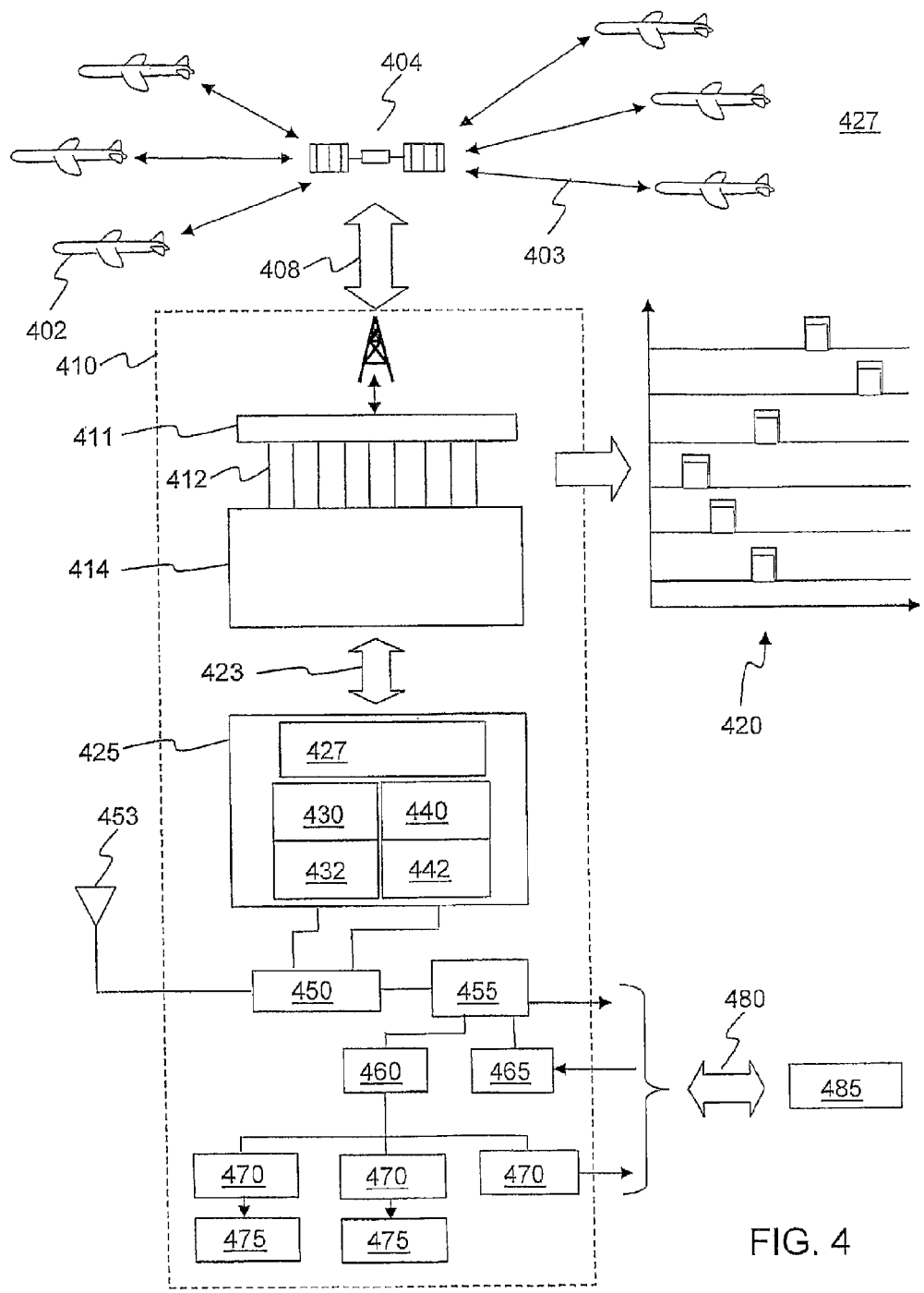
FIG. 4 is a block diagram of an augmented aircraft communication system, according to another embodiment.

FIG. 4 is a block diagram of an augmented aircraft communication system 400, according to an embodiment. A system, which may allow bi-directional communication flow, may be used for communication among one or more aircraft or one or more ground stations, in one embodiment. In a particular implementation, one or more aircraft 402 may communicate to a ground station 485 via a relay comprising satellite 404. To communicate via a relay, aircraft 402 may use a secondary system, whereas a primary system, may be used for line-of-sight communication. A secondary system aboard aircraft 402, such as secondary system 205 shown in FIG. 2, may include a directional coupler 212 to acquire inductive signal representations transmitted (or about to be transmitted) from a primary system 211. Inductive signal representations may be reformatted or converted to a format compatible or compliant with a communication system used by satellite 404. Subsequently, reformatted or converted signals may be transmitted by secondary system 205 to satellite 404 via a portion of a secondary communication link 403. Satellite 404 may relay communication signals to a ground-based system 410 via a satellite communication link 408. In one implementation, for example, satellite communication link 408 may comprise a C-band link to convey communications from a relatively large number of aircraft within a relatively large geographical radius, such as a 1500 mile radius, for example, though claimed subject matter is not so limited. Communication signals received by ground-based system 410 may by provided to a demultiplexing switch 411 to sort communication signals into individual channels corresponding to particular aircraft. In one implementation, individual channels may be determined by detecting relative phases of multiple signals corresponding to multiple aircraft 402. As an illustrative example, plot 420 shows plots of amplitude versus time of six signals corresponding to six aircraft having different phases. Subsequent to demultiplexing communication signals, resulting individual channels 412 may be provided to a signal processor 414 to convert a data rate used by satellite communication link 408 to a data rate used by a ground-based primary system, such as primary system 221 shown in FIG. 2. For example, satellite communication link 408 may use 9600 bits per second and a primary system may use one million bits per second, though claimed subject matter is not so limited.

Converted communication signals may be transmitted over serial bus 423 to processor block 425 where communication signals may be further reformatted to be compatible or compliant with a primary system. For example, processor block 425 may comprise a processor 427, a modulator 430, a demodulator 440, a transmit converter 432, and a receive converter 442. Similar to processor 227 shown in FIG. 2, for example, processor 427 may be programmed with executable code or software using a number of techniques. For example, a SIM card may provide stored information that includes desired frequency or modulation/demodulation configuration parameters. Stored information may comprise executable code, parameters to be used by executable code maintained in processor 427, or both. Accordingly, multiple configurations may be available for various applications. For example, a particular SIM card may again in one example implementation provide software or firmware for block 425 to operate in accordance with 978 MHz UAT transport protocol, 1090ES transport protocol, or some other transport protocol.

Modulator 430 may reformat transmitted communication signals to a particular transport protocol to be compatible or compliant with a secondary system that may utilize satellite relay 404, whereas modulator 440 may reformat received communication signals to a particular transport protocol to be compatible or compliant with a primary system. Transmit converter 432 may receive communication signals from a primary system at a particular transport protocol and provide signals to modulator 430. Receive converter 442 may transmit communication signals from a secondary system at a particular transport protocol and provide signals to directional coupler 450. In one implementation, directional coupler 450 may receive communication signals from an airborne (line of sight) primary system via antenna 453 or may receive communication signals from a secondary system via receive converter 442. In one embodiment, a directional coupler may allow communication signals to pass from satellite-based secondary system to a primary system, for example.

Subsequently, directional coupler 450 may provide received signals to a ground-based transceiver 455. In an opposite direction or bi-directional path, directional coupler 450 may provide a sample of signals received from ground-based transceiver (GBT) 455 to transmit converter 432. Ground-based transceiver 455 may receive signals from uplink sever 465 or provide signals to a GBT server 460. One or more servers may connect or couple to display or user interface devices 475. Via a communication link 480, which may comprise a WAN, LAN, intranet, or the Internet for example, information may be transmitted to or received from ground station 485. Of course, details of communication system 400 are merely examples and claimed subject matter is not limited in this respect.

Figure 5:
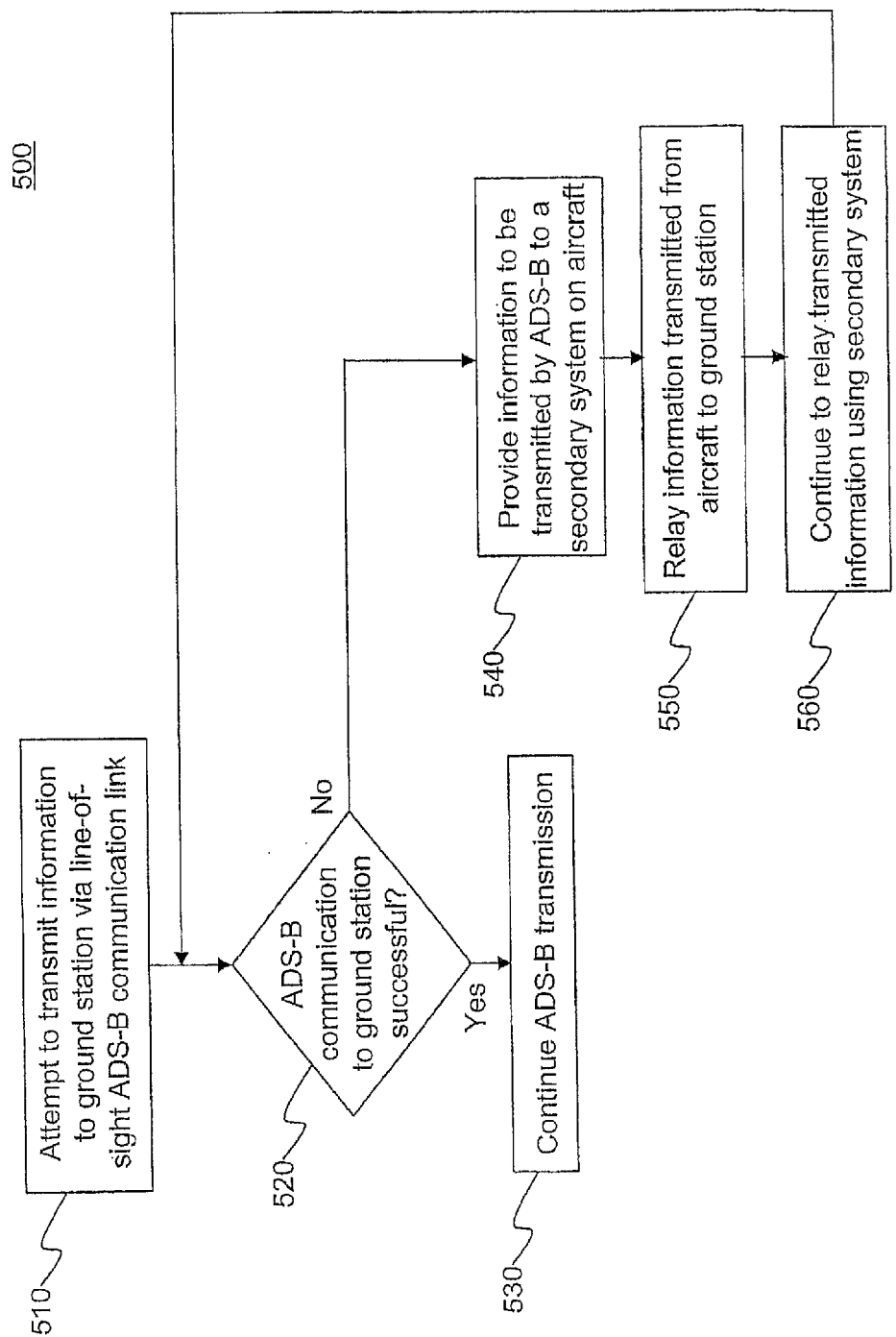
FIG. 5 is a flow diagram of a process of communicating between an aircraft and a ground station, according to an embodiment.

FIG. 5 is a flow diagram of a process 500 of communicating between an aircraft and a ground station, according to a particular embodiment. At block 510, an aircraft may attempt to transmit communication information to a ground station via a line-of-sight ADS-B communication link. Of course, techniques other than ADS-B may be used, such as for line-of-sight communication, and claimed subject matter is not limited to such an example. At block 520, a determination may be made as to whether an attempted ADS-B transmission to a ground station resulted in detection of a signal of sufficient signal strength to result in a successfully reliable communication. In one implementation, such a determination may be made resulting from success/failure to receive communication from a ground station, wherein communication may comprise acknowledgement that the ground station received the aircraft transmission or may comprise broadcasts transmitted by the ground station. For example, if ADS-B signals transmitted from a ground station via a line-of-sight communication link are received by an aircraft, it may be determined that ADS-B transmission from the aircraft may be received at the ground station. In another implementation, a determination may be made based, at least in part, on geodetic location of an aircraft or a nearest ground station. For example, location coordinates of multiple ground stations may be maintained on an aircraft. If location coordinates are compared with a present location of an aircraft, distance between the aircraft and a nearest ground station, or one of a set of near ground stations, may be calculated to determine if a distance is within line-of-sight of the aircraft. If so, then attempted ADS-B communication to a ground station may be determined, at block 520, to be successful (e.g., sufficient signal strength to be a reliable communication). After a determination, process 500 may proceed to block 530, where ADS-B transmission may proceed. If, however, ADS-B communication to a ground station is determined to be unsuccessful (e.g., not sufficient signal strength to be a reliable communication), then process 500 may proceed to block 540 to invoke an alternate technique of communicating to or with a ground station. An alternate technique may comprise a non line-of-sight communication link. For example, a communication link may comprise a secondary link as described in detail above. Thus, at block 540, communication information that may otherwise be transmitted by an ADS-B system may be provided to a secondary system. For example, a directional coupler, such as directional coupler 212 shown in FIG. 2, may inductively sample ADS-B antenna signals and subsequently provide a sampling to a secondary system.

At block 550, secondary system may transmit information to a relay, such as a satellite for example, which may subsequently relay information to a ground station. Thus, assisted by a relay, an aircraft may communicate to or with a ground station that may be located at a range beyond line of sight of an aircraft. For example, at block 560, an aircraft may continue to use a secondary system whether or not a primary or ADS-B system may communicate with a ground station (e.g., aircraft and ground station within line of sight of one another). A disadvantage, however, of using a secondary system may include a possibility that a secondary system may be associated with relatively high monetary costs. For example, utilizing a communication satellite as a relay for a secondary system may be relatively expensive compared to using line-of-sight ADS-B. Because a travelling aircraft may travel in and out of line-of-sight range of one or more ground stations, ADS-B may be usable at various times. Thus, if ADS-B communication is not sufficiently powerful or reliable at one time, it may be sufficiently powerful or reliable at a subsequent time. Accordingly, in one particular implementation, process 500 may loop back to block 520 where another determination may be made as to whether or not ADS-B may be reliably used for communication to or with a ground station.

Though process 500 may include a condition affecting use of a secondary system (e.g., block 520), a condition need not be considered to determine whether to use a secondary system in another implementation. For example, a primary system such as ADS-B and a secondary system may be concurrently used whether or not one or the other system results in sufficiently reliable reception of communication signals at a ground station.

It is, of course, noted that any one of a large variety of secondary aircraft communications are possible. A variety of components or subsystems may be purchased or designed for this purpose. Likewise, in any given system, a large number of engineering tradeoffs are possible. Therefore, will what follow is an illustration of a possible implementation, claimed subject matter is in no way intended to be limited to this particular example implementation. The following implementation is provided merely for illustration purposes. A secondary aircraft or other communication system may significantly depart from the implementation that follows and still remain within the scope of claimed subject matter.

Figure 6:
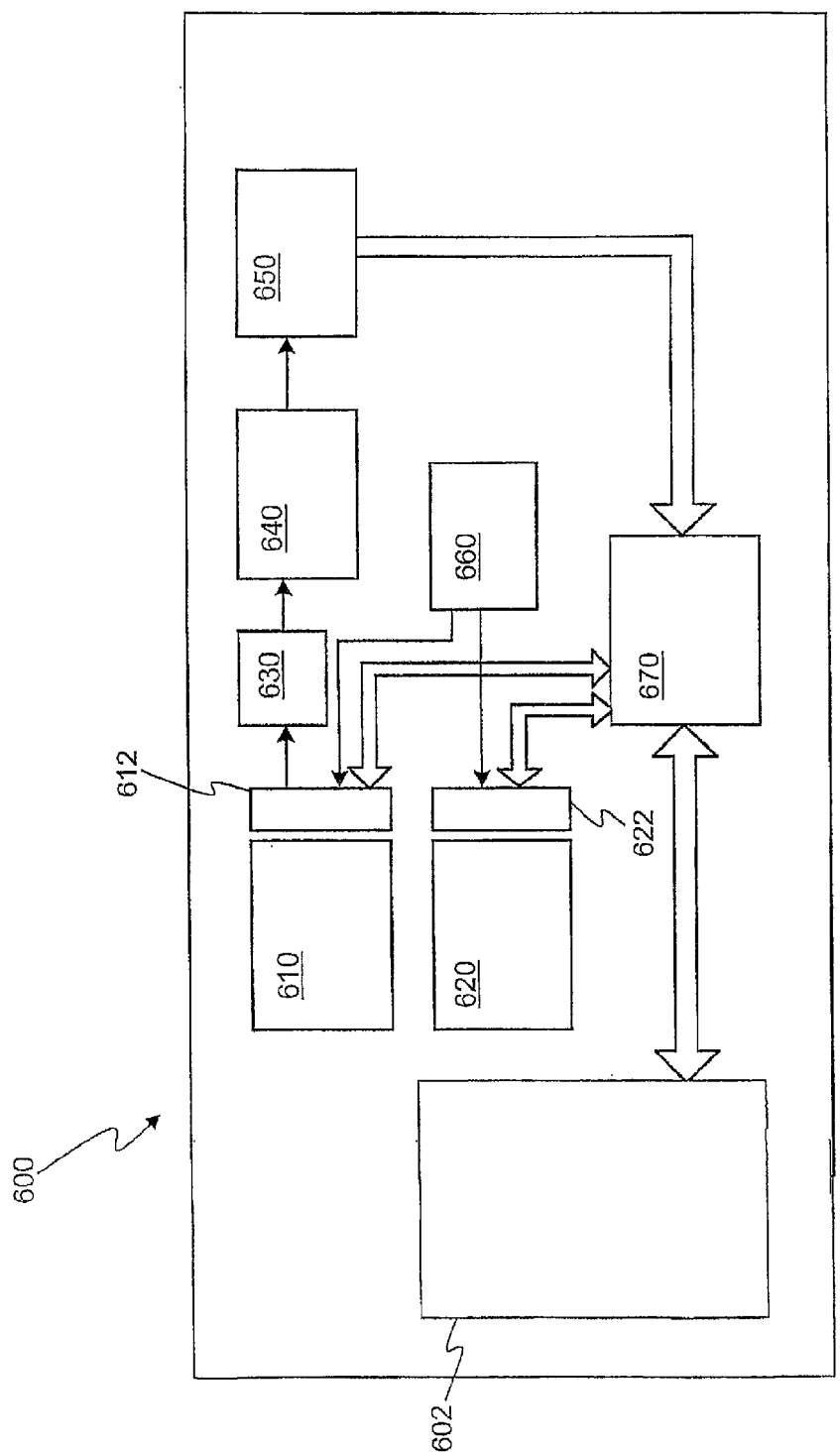
FIG. 6 is a block diagram of a portion of an aircraft communication system, according to an embodiment.

FIG. 6 is a block diagram of a portion of a secondary aircraft communication system, according to an embodiment. A portion may comprise, for example, a digitizer-buffer 600 to interface with or perform operation of a secondary system. For example, digitizer-buffer 600 may be used for acquisition of analog demodulated signals provided by a receiver 610. Analog signals may be converted into digital form by a relatively high speed, analog-to-digital converter (ADC) 640, and subsequently stored in a first-in-first-out (FIFO) buffer 650 for later processing in one implementation. Receiver 600 may receive communication signals in bursts rather than continuous, synchronous signals, digitizer-buffer 600 may process burst signals so that a secondary system may sync with transmitted bursts.

Digitizer-buffer 600 may comprise one or more discrete modules or components mounted on a printed circuit board (PCB), for example. Digitizer-buffer 600 may interface with other portions of a secondary system via connectors 612, or 622. For example, in one implementation, receiver 610 may interface with digitizer-buffer 600 via connector 612 while transmitter 620 may interface with digitizer-buffer 600 via connector 622. In one implementation, receiver 610 or transmitter 620 may operate at 978 MHz, which may be compatible or compliant with a wireless satellite communication link, for example. Microcontroller 602, which may be used to diagnose, test, or set various parameters of a secondary system, may interface with one or more serial ports (e.g., RS232), read-only memory to maintain configuration parameters used by digitizer-buffer 600, or a master oscillator (not shown). In addition, oscillator 660, without limitation, may provide a reference clock signal to phase-lock loop circuitry that may be included in receiver 610 or transmitter 620. In one example, a clock signal may comprise a 12.0 MHz square pulse, though claimed subject matter is not so limited. A demodulated analog output signal of digitizer-buffer 600 may be buffered by filter 630 before being digitized by ADC 640. In one implementation, ADC 640 may comprise an eight-bit ADC capable of 32 million samples per second (MSPS), for example. Digital data generated by ADC 640 may be buffered by FIFO buffer 650 capable of buffering relatively long signal bursts. A programmable logic device 670 may implement "glue logic" involved with operating ADC 640 or FIFO buffer 650, for example.

In one embodiment, without limitation, of course, ADC 640 may sample analog signals provided by receiver 610 in a range set by two analog reference voltages. Analog voltages may be generated by two 12-bit digital-to-analog converters (DAC), for example. Resulting digitized samples (which may comprise 8-bit samples) may be stored in a FIFO buffer 650, which may be capable of storing up to 128 k samples, for example. ADC 640 or FIFO buffer 650 may be managed by "glue logic" embedded in programmable logic device 670. Executable code may be executed by a processor (not shown) to manage various processes. A processor may, for example, interface with digitizer-buffer 600 via a serial port to microcontroller 602.

If a signal burst is received, presence of RF may be detected, buffered, or synchronized for signal capture. Signals may be generated by ADC 640 or buffered by FIFO buffer 650 as a result of an acceptable RF signal being detected at receiver 610. If reception of RF terminates, burst processing software maintained by a processor (not shown)

may begin to perform a number of operations. For example, operations may include transferring received signals out of FIFO buffer 650 to memory, or calculating DC bias. For the latter, for example, two parameters such as a range of signal values may be calculated from received signals. If an analog range of ADC 640 were matched with an analog signal provided by receiver 610, a range of signal values may be centered on a middle of an ADC digital range, for example, but not necessarily. An operation may also include DC bias removal as another example. To remove or reduce remaining DC offset, an acceptable range of signal values measured from received signals may be used to reduce or remove a DC bias and obtain a range of signals centered on a middle of an ADC digital range, for example. Another example operation may include calculation of a transition histogram. For example, without limitation, ADC samples may be sampled at eight times a bit rate (e.g., 8.333 MHz), for example. To perform bit synchronization, a determination may be performed to determine which ADC samples correspond to a center of incoming bits. To accomplish synchronization, a histogram may be created by determining the number of signal zero crossings for individual sample phases. In other words, if a zero crossing is detected (consecutive samples having different arithmetic signs) an accumulator corresponding to a particular sample-phase may be incremented. To perform appropriate calculations, signal zero crossings may be grouped into a number of sample phase bins. Another operation may include bit demodulation or re-sampling. Received signals may be re-sampled selecting center-of-bit samples as selected by previous calculations, for example. Still another operation may include sync pattern detection. For example, received signals may be examined to determine a presence of a fixed UAT sync header, as one example. Early bits of received signals may have been compromised by transients at the start of a burst for example. A portion of sync Header bits may therefore be examined, for example. If a desired pattern is matched or detected, proper byte alignment may take place. Another operation may include byte synchronization or message formatting. Received signals may be shifted to properly format received bytes, for example. Of course, details presented in the above description of digitizer-buffer 600 are merely examples, and claimed subject matter is not so limited.

It will, of course, be understood that, although particular embodiments have just been described, claimed subject matter is not limited in scope to a particular embodiment or implementation. For example, one embodiment may be in hardware, such as implemented on a device or combination of devices, for example. Likewise, although claimed subject matter is not limited in scope in this respect, one embodiment may comprise one or more articles, such as a storage medium or storage media that may have stored thereon instructions that if executed by a specific or special purpose system or apparatus, for example, may result in an embodiment of a method in accordance with claimed subject matter being executed, such as one of the embodiments previously described, for example. However, claimed subject matter is, of course, not limited to one of the embodiments described necessarily. Furthermore, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may now occur to those skilled in the art. It is, therefore, to be understood that the appended claims are intended to cover all such modifications or changes as fall within the true spirit of claimed subject matter.

What is claimed is:

1. A method comprising:
   acquiring, from an output signal port of a directional coupler, a signal representation of tracking parameters to be transmitted by a primary communication system via a line-of-sight communication link;
   providing the signal representation to a secondary non line-of-sight communication system;
   reformatting the signal representation to be compatible or compliant with the secondary non line-of-sight communication system; and
   transmitting the reformatted signal representation using the non line-of-sight communication system via a non line-of-sight communication link that includes at least one communication relay, the secondary non line-of-sight communication system to utilize a slower pulse train than the primary communication system.

2. The method of claim 1, wherein the transmitting further comprises transmitting to a ground station.

3. The method of claim 1, wherein the transmitting further comprises transmitting the reformatted signal representation from an aircraft.

4. The method of claim 1, wherein the acquiring the signal representation further comprises acquiring a signal representation without significantly modifying the tracking parameters.

5. The method of claim 1, wherein the line-of-sight communication link comprises an automatic dependent surveillance-broadcast (ADS-B) link.

6. The method of claim 1, wherein the at least one communication relay comprises a communication satellite.

7. The method of claim 1, wherein at least a portion of the non line-of-sight communication link comprises the Internet or an intranet.

8. The method of claim 1, wherein the tracking parameters comprises aircraft tracking parameters.

9. The method of claim 1, wherein the reformatted signal representation includes communication parameters identical to the tracking parameters transmitted by the primary communication system.

10. A method comprising:
    receiving tracking parameters via a secondary non line-of-sight communication link that includes at least one communication relay;
    reformatting the received tracking parameters to be compatible or compliant with a primary line-of-sight communication system;
    acquiring, from an output signal port of directional coupler a signal representation of the reformatted tracking parameters, wherein the acquiring is performed noninvasively with respect to the primary line-of-sight communication system; and providing the signal representation of reformatted tracking parameters to the primary line-of-sight communication system, wherein the secondary non line-of-sight communication link to utilize a slower pulse train than the primary line-of-sight communication system.

11. The method of claim 10, wherein the receiving further comprises receiving at a ground station.

12. The method of claim 10, wherein the receiving further comprises receiving on an aircraft.

13. The method of claim 10, wherein the line-of-sight communication link comprises an automatic dependent surveillance-broadcast (ADS-B) link.

14. The method of claim 10, wherein at least a portion of the secondary non line-of-sight communication link comprises the Internet.

15. The method of claim 10, wherein the tracking parameters comprises aircraft tracking parameters.

16. An apparatus comprising:
a directional coupler having an output signal port from which to acquire a signal representation of tracking parameters to be transmitted by a primary communication system via a line-of-sight communication link;
a secondary non line-of-sight communication system to receive the signal representation of tracking parameters;
a signal processor to reformat the signal representation of tracking parameters to be compatible or compliant with the secondary non line-of-sight communication system; and
a transmitter to transmit the reformatted signal representation of tracking parameters via a use of the secondary non line-of-sight communication system via a non line-of-sight communication link to include at least one communication relay, the secondary non line-of-sight communication system to utilize a slower pulse train than the primary communication system.

17. The apparatus of claim 16, wherein the transmitter is located at a ground station.

18. The apparatus of claim 16, wherein the transmitter is located on an aircraft.

19. The apparatus of claim 16, wherein the directional coupler to acquire the signal representation of tracking parameters without significant modification to the tracking parameters.

20. The apparatus of claim 16, wherein the line-of-sight communication link is to comprise an automatic dependent surveillance-broadcast (ADS-B) link.

21. The apparatus of claim 16, wherein the at least one communication relay is to comprise a communication satellite.

22. The apparatus of claim 16, wherein at least a portion of the non line-of-sight communication link is to comprise the Internet.

23. The apparatus of claim 16, wherein the tracking parameters are to comprise aircraft tracking parameters.

24. An apparatus comprising:
a receiver of a secondary non line-of-sight communication system to receive aircraft tracking parameters via a non line-of-sight communication link that includes at least one communication relay;
a signal processor to reformat the received aircraft tracking parameters to be compatible or compliant with a primary line-of-sight communication system, and
a directional coupler having an output signal port from which to acquire a signal representation of the reformatted aircraft tracking parameters and to provide the signal representation of the reformatted aircraft tracking parameters to the primary line-of-sight communication system, wherein
the secondary non line-of-sight communication system to utilize a slower pulse train than the primary line-of-sight communication system.

25. The apparatus of claim 24, wherein the receiver is located at a ground station.

26. The apparatus of claim 24, wherein the receiver is located on an aircraft.

27. The apparatus of claim 24, wherein the line-of-sight communication link is to comprise an automatic dependent surveillance-broadcast (ADS-B) link.

* * * * *